United States Patent [19]

Hartman

[11] Patent Number: 4,769,875
[45] Date of Patent: Sep. 13, 1988

[54] ELASTIC REINFORCED TIE-DOWN STRAP AND METHOD OF MAKING THE SAME

[76] Inventor: Dan E. Hartman, P.O. Box 4401, Elkhart, Ind. 46514

[21] Appl. No.: 53,260

[22] Filed: May 22, 1987

[51] Int. Cl.$^4$ .................. A44B 13/02; A44B 21/00
[52] U.S. Cl. ................................ 24/300; 24/298; 24/371; 428/68
[58] Field of Search ............. 24/300, 301, 302, 298, 24/17 B; 428/68, 78; 2/339

[56] References Cited

U.S. PATENT DOCUMENTS

| | | | |
|---|---|---|---|
| 190,535 | 5/1877 | Armstrong | 2/339 |
| 2,044,783 | 6/1936 | Harshberger | 428/68 |
| 2,781,062 | 2/1957 | White | 2/339 |
| 2,820,269 | 1/1958 | Wolff | 24/300 |
| 2,991,524 | 7/1961 | Dobrikin | 24/371 |
| 3,049,774 | 8/1962 | Rhodes et al. | 24/536 |
| 3,466,219 | 9/1969 | Schwartz | 428/68 |
| 3,762,977 | 10/1973 | Langfeldt | 428/68 |
| 4,490,424 | 12/1984 | Gerace | 428/68 |
| 4,549,411 | 10/1985 | Ivey | 24/298 |
| 4,606,687 | 8/1986 | Mantela et al. | 24/300 |

FOREIGN PATENT DOCUMENTS 0609783 11/1960 Canada ................. 24/300

*Primary Examiner*—Victor N. Sakran
*Attorney, Agent, or Firm*—Albert L. Jeffers

[57] ABSTRACT

An elastic reinforced tie-down strap includes a core of nonstretchable reinforcing filament formed in a series of closed loops, and a casing of resilient stretchable material encasing the core and having a plurality of spaced anchor holes defined therein through the centers of the respective closed loops. The strap is fabricated using a method which provides the casing in an elongated strip-like form with the filament core extending longitudinally through the casing. The strap together with several S-shaped anchor hooks having ends adapted to be inserted through the anchor holes of the strap provide a tie-down strapping device. The closed loops of the filament are tied together so as to provide tear resistance in the casing around the anchor holes. Also, the closed loops within the casing are deformable to permit sufficient longitudinal stretch in the casing to facilitate hooking and unhooking of the anchor hook in securement and releasing securement of the strapping device, while at the same time the filament loops limit the longitudinal stretch in the casing to prevent recoil movement of the strapping device in the event of a sudden release of the securement thereof. The casing with the filament core therein is adapted to be wound into a roll thereof, and is severable so as to permit cutting desired lengths of the strap from the roll.

25 Claims, 4 Drawing Sheets

ELASTIC REINFORCED TIE-DOWN STRAP AND METHOD OF MAKING THE SAME

BACKGROUND OF THE INVENTION

1. Field of the Invention

The present invention generally relates to devices for securing cargo and, more particularly, is concerned with a multi-purpose elastic reinforced tie-down strap and a method of making the strap.

2. Description of the Prior Art

Currently in wide use for securing cargo on vehicles and trailers and for holding down tarpaulins, tents and miscellaneous materials are a wide variety of strapping devices. Examples are a solid rubber strap, a woven synthetic strap, a bungee cord, a steel chain and an ordinary rope.

Each of these devices has drawbacks. The solid rubber strap and bungee cord have too much elasticity and too little strength. There is growing concern over the danger posed by excessive elasticity in a rubber tie-down strap in view of its tendency to snap like a slingshot upon coming loose. A woven synthetic strap has lots of strength and is useful in longer lengths; but, it is of little practical value in the more popular lengths, such as one to four feet. A steel chain is very strong and can be easily made into any desired length; however, it is only practical for heavy-duty jobs due to its lack of elasticity and tremendous weight. The common, or ordinary, rope is cheap, lightweight and strong enough for light and medium duty jobs, but not easy to attach securely due to lack of sufficient elasticity. Also, it is not practical for use in the popular short lengths.

In view of the foregoing drawbacks, a need exists for a fresh approach to the design of a strapping device to hold cargo, attach tarpaulins, and to secure light materials against high winds. None of the currently-used strapping and hold-down devices have the combination of characteristics which would prove desirable, beneficial and useful in a wide variety of applications. An improved tie-down or strapping device having this combination of characteristics would be more elastic and easier to adjust than ordinary rope, lighter in weight than steel chain, stronger and safer to use than solid rubber straps, and easy to attach and manage in a variety of lengths.

SUMMARY OF THE INVENTION

The present invention provides an elastic reinforced tie-down strap designed to satisfy the aforementioned needs and provide the aforementioned combination of characteristics. Underlying the present invention is the concept of uniquely combining together seemingly disparate materials to provide a device which embodies the combination of characteristics deemed to be beneficial and useful in a wide variety of strapping applications.

The strap of the present invention incorporates a reinforcing synthetic filament core fashioned into a continuous series of tied closed loops and a resiliently yieldable or stretchable rubber encasement, covering or casing molded in an elongated strip-like form to encase the continuous series of closed loops. An "eye" or anchor hole is defined in the resilient casing in the center of each filament loop to receive an anchor, or adjustment, hook, such as one hook end of an "S" configuration, whenever desired.

The filament loop provides tear resistance around the anchor hole. In addition, the closed-loop filament core permits just enough longitudinal stretch or elasticity in the casing of the strap to allow easy hooking or unhooking of the anchor hook, while at the same time limiting the stretch of the casing enough to prevent dangerous recoil in the event of a sudden release of the strap. The filament core can readily be varied as to the number of strands, diameter of the loops or the tensile strength to provide straps of different load capacities without changing the basic construction. The continuous closed-loop filament core also allows cutting to the desired length with an ordinary knife at any point, which destroys only the loop and anchor hole where the division is made.

The continuous chain-like design and the materials used in the construction of the strap permits it to be wound and distributed in large rolls which provide for certain manufacturing and merchandising economies by eliminating the need to make and stock a variety of fixed lengths as is now the case with conventional strapping devices. The ultimate customer, or user, can merely purchase one length from a roll of the strap and later subdivide it into any useful length needed. The ultimate user also benefits by having a strap that is more versatile and safer to use than any competitive products currently available.

Accordingly, the present invention is directed to an elastic reinforced tie-down strap which includes a core of reinforcing substantially nonstretchable synthetic filament formed in a series of closed loops, and a casing of resilient stretchable material encasing the core and having a plurality of spaced anchor holes defined therein through the respective closed loops of the filament core.

The anchor holes are defined at respective centers of the closed loops of the filament core, and have countersunk configurations at opposite ends thereof. Further, the resilient stretchable material of the casing has a predetermined length of longitudinal stretch. The closed loops of filament encased by the casing are deformable in configuration to permit a length of longitudinal stretch of the casing substantially less than the predetermined length of longitudinal stretch thereof. Additionally, the closed loops of the core of filament are tied together. In one form, the core of filament includes overhand knots formed between the closed loops thereof, whereas, in another form, square knots are formed between the closed loops. Also, the filament core and the casing are severable so as to permit cutting thereof to desired lengths. The casing with the filament core therein is adapted to be wound into a roll thereof so that the desired lengths of the strap can be cut from the roll.

The present invention also is directed to a tie-down strapping device which includes the elastic reinforced tie-down strap, and at least one anchor hook with an end adapted for insertion through at least one of the anchor holes in the casing.

The present invention further is directed to a method of making the elastic reinforced tie-down strap wherein opposite upper and lower halves of the casing are successively molded with the filament core being disposed in a longitudinally-extending relation to provide an elongated strip-like form with the filament core encased by and extending longitudinally through the casing. The method of making the elastic reinforced tie-down strap includes placing in a longitudinally extending disposition a core of reinforcing nonstretchable filament formed in a series of connected closed loops in a first mold having recesses defined therein being interconnected in a pattern adapted to receive the longitudinally extending core. A first of a pair of opposite upper and lower longitudinally extending halves of a casing is fabricated in the first mold such that the first casing half substantially encases the longitudinally extending core and generally overlies one side of the core. The second of the pair of opposite upper and lower halves of the casing is then fabricated in a second mold such that the second casing half overlies the other side of the core and attaches to the first casing half thereby providing an elongated strip-like casing with the filament core encased by and extending longitudinally through the casing.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE PREFERRED EMBODIMENTS

Figure 3:
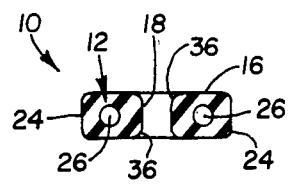
FIG. 3 is a cross-sectional view of the strap taken along line 2—2 of FIG. 2.
Figure 1:
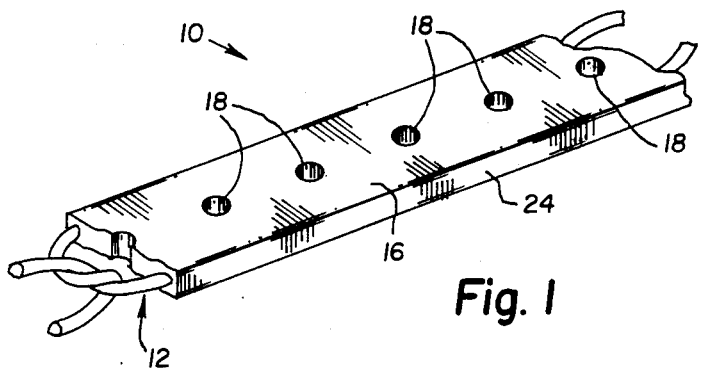
FIG. 1 is a perspective view of the elastic reinforcing tie-down strap of the present invention with the end portions of the resilient casing removed to expose the reinforcing filament core.

Referring now to the drawings, and particularly to FIGS. 1-4, there is shown one embodiment of the elastic reinforcing tie-down strap 10 of the present invention. The tie-down strap includes a core 12 of substantially nonstretchable reinforcing synthetic filament formed in a series of closed loops 14, and a casing 16 of resilient stretchable material covering or encasing core 12. The casing 16 has a plurality of spaced "eyes" or anchor holes 18 defined therein through the centers of the respective closed loops 14.

Figure 12:
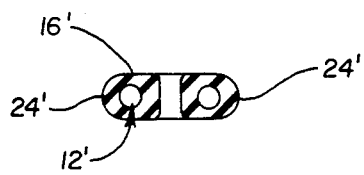
FIG. 12 is a cross-sectional view of the modified strap taken along line 12—12 of FIG. 11.

As will be described in greater detail hereafter, tie-down strap 10 is preferably made by a molding method wherein opposite upper and lower halves 20 and 22 (FIGS. 9 and 10) of casing 16 are successively molded with filament core 12 disposed in a longitudinally-extending relation to provide strap 10 in an elongate strip-like form with filament core 12 encased by and extending longitudinally through casing 16. Thus, casing 16 is in an elongate strip-like form with filament core 12 extending longitudinally through casing 16. In one form shown in FIGS. 1-3, casing 16 has opposite longitudinal edges 24 which extend in a generally linear fashion and parallel with respect to one another. In another form shown in FIGS. 11-12, casing 16' has opposite longitudinal edges 24' which extend in generally undulating configurations which match the configurations of the respective opposite semi-circular side segments 26 of closed loops 14 of filament core 12.

Figure 4:
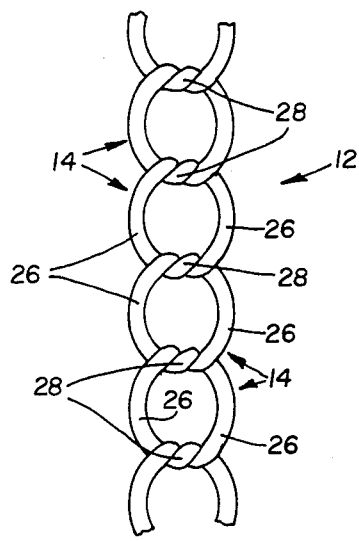
FIG. 4 is a plan view of the reinforcing filament core of the strap of FIGS. 1 and 2, illustrating overhand knots between the continuous series of closed loops of the core.
Figure 5:
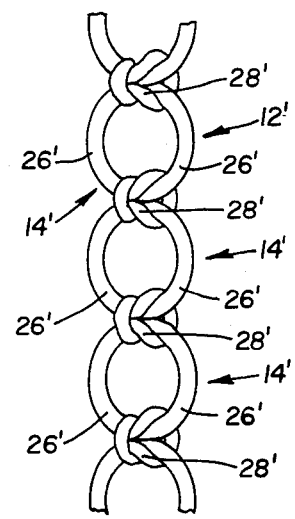
FIG. 5 is a plan view of a modified form of the reinforcing filament core of the strap, illustrating square knots between the continuous series of closed loops of the core.
Figure 2:
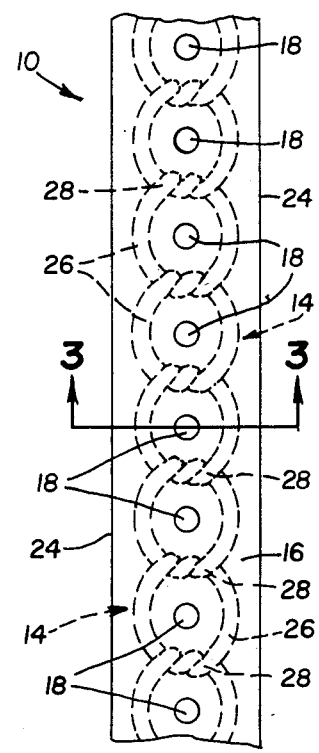
FIG. 2 is plan view of the strap of FIG. 1.

More particularly, closed loops 14 of filament core 12 are tied together. In FIGS. 2 and 4, core 12 includes overhand knots 28 formed between side segments 26 of the closed loops thereof. However, in the preferred form shown in FIG. 5, core of filament 12' includes square knots 28' formed between side segments 26' of closed loops 14' thereof. Closed loops 14 of filament 12 are tied together so as to provide tear resistance and limit the stretchability of casing 12 around anchor holes 18.

By way of example, the core of filament 12 can be composed of nylon rope-like material or polypropylene rope-like material which can be either multi-strand or mono-strand and generally strong and flexible. Both are substantially nonstretchable or nonelastic and of high strength as compared to casing 16 which is composed of a material of high elasticity and low strength, for instance, ordinary rubber material. Another material for casing 16 can be an air dried latex molding rubber, and other suitable alternatives are readily available.

The resilient stretchable material of the casing 16 has a certain length of longitudinal stretch compared to its unstretched length. However, closed loops 14 of filament 12 encased by casing 16 drastically limit the degree of stretching that casing 16 can undergo. Casing 16 can only increase in length or stretch by the amount that filament core 12 can increase in length. Filament core 12 can only increase in length by bringing the opposite side segments 26 of its closed loops 14 closer together, or, in other words, by deforming loops 14 from generally circular to oblong configurations. The maximum increase in length in this manner is relatively slight compared to a given overall length of core 12. Thus, the length of longitudinal stretch of casing 16 which is possible with the filament core 12 embedded or encased therein is substantially less than the length of longitudinal stretch possible without the presence of core 12.

The significant benefits for the user to be gained from the foregoing described embodiments are substantially reduced recoil capability in strap 10 and substantially greater strength. Closed loops 14 within casing 16 are deformable enough to permit sufficient longitudinal stretch in casing 16 to facilitate hooking and unhooking of anchor hooks, such as the S-shaped hooks 30 shown in FIGS. 6 and 7A-7C. On the other hand, filament loops 14 limit the longitudinal stretch in casing 16, in the manner explained above, to prevent recoil movement of strapping device 32 formed of strap 10 and hooks 30 in the event of a sudden release of the securement thereof.

Figure 6:
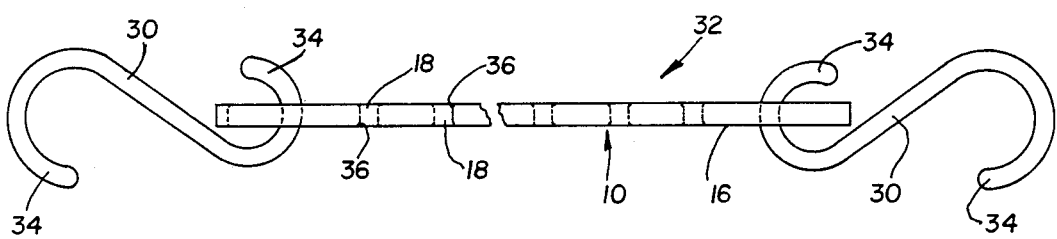
FIG. 6 is a side elevational view of the strap of FIG. 1, showing S-shaped anchor hooks received in anchor holes at opposite ends of the segment of strap which is being shown in foreshortened form.
Figure 7A:
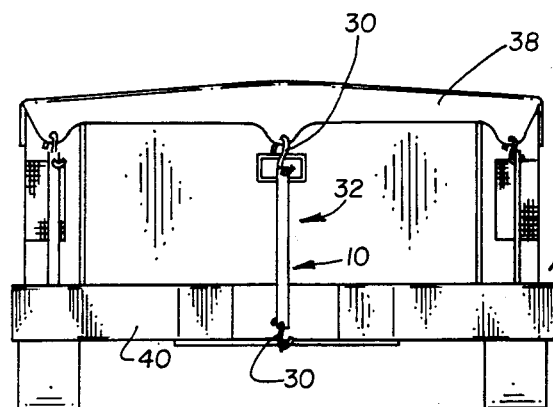
FIGS. 7A-7C are views of several of many different ways the strap of the present invention can be applied with S-shaped hooks to secure a tarpaulin over a load on a truck.
Figure 7B:
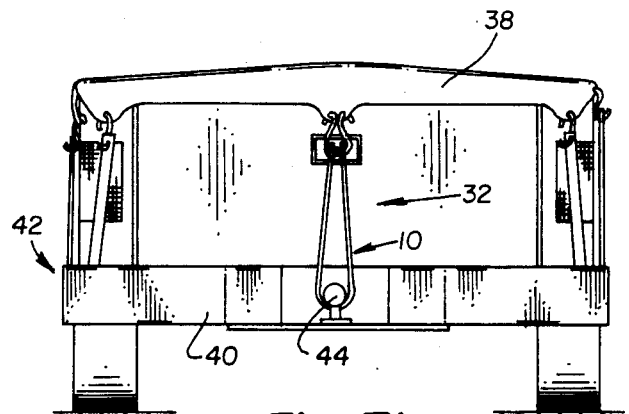
Figure 7C:
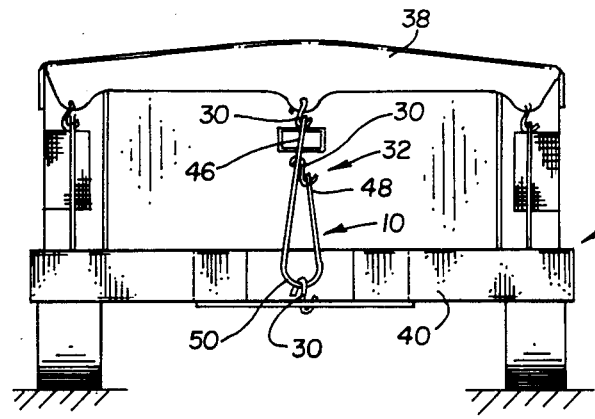

As seen in FIG. 6, strap 10 together with several S-shaped anchor hooks 30, having curved ends 34 adapted to be inserted through the anchor holes 18 of the strap, provide a tie-down strapping device 32. Anchor holes 18 have flared or countersunk configurations at opposite ends 36 thereof for facilitating insertion therethrough of one end 34 of anchor hook 30. In FIGS. 7A-7C, a variety of ways are illustrated in which strap 10 can be used to secure a tarpaulin 38 to base 40 of a truck 42. In FIG. 7A, strap 10 extends vertically and is secured at its opposite ends by anchor hooks 30 inserted through respective anchor holes in strap 10 and a hole in base 40 and an eyelet in tarpaulin 38. In FIG. 7B, strap 10 extends around and under a bar 44 mounted on base 40 and then upward to where both of its ends are secured by respective anchor hooks 30 to a pair of eyelets in tarpaulin 38. In FIG. 7C, strap 10 has one end 46 secured by a hook 30 to tarpaulin 38, its other end 48 secured by another hook 30 just below its one end 46, and an intermediate portion 50 thereof secured by still another hook 30 to base 40. Thus, the versatility of strap 10 can readily be appreciated just from these three different ways of securing tarpaulin 38 to truck base 40.

Figure 13:
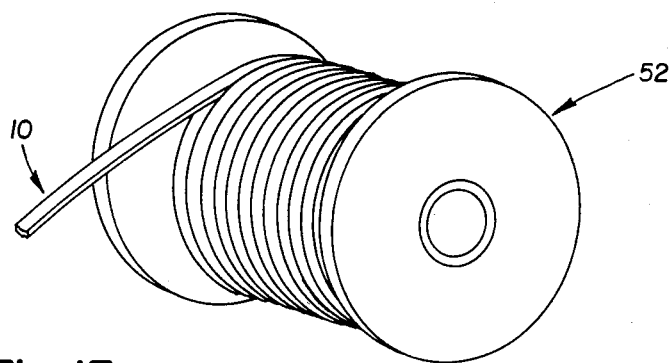
FIG. 13 is a perspective view of the strap in roll form as it might be distributed to and merchandised at a retail store.

As depicted in FIG. 13, casing 16 with filament core 12 therein comprising strap 10 is adapted to be wound into a roll 52 thereof. The materials making up filament core 12 and casing 16 are severable so as to permit cutting desired lengths of strap 10 from the roll 52. Optimally, strap 10 should be severed transversely across the center of a given loop 14.

Figure 8:
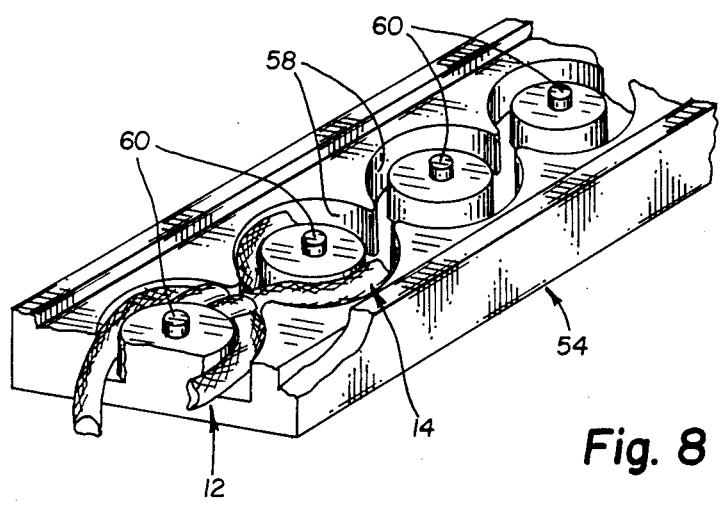
FIGS. 8-10 are perspective views of the sequence of steps involved in making the strap.
Figure 9:
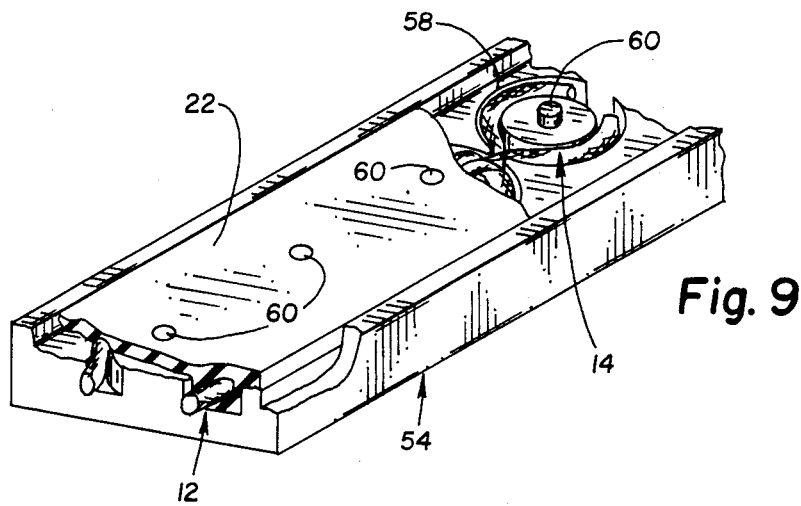
Figure 10:
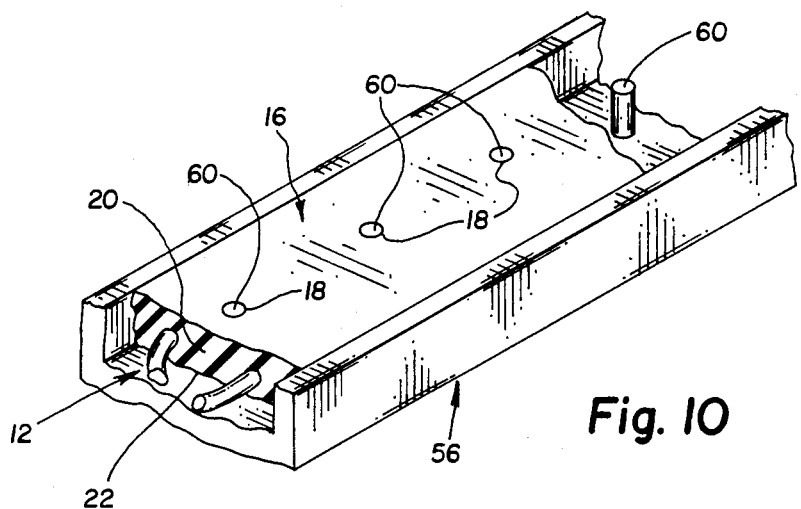
Figure 11:
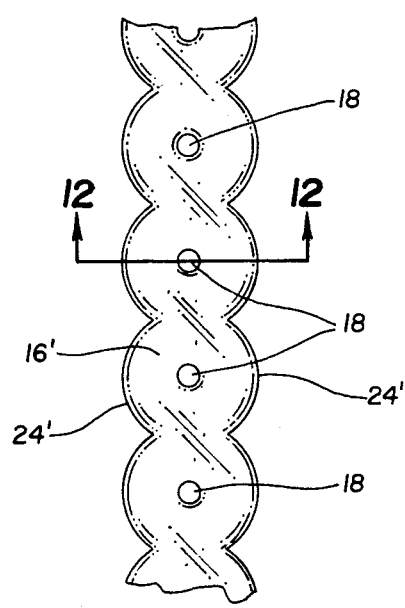
FIG. 11 is a plan view of the strap similar to that of FIG. 2, however, illustrating a modified form of the resilient casing of the strap.

FIGS. 8-10 depict one possible method of making the elastic reinforcing tie-down strap 10. Generally, the method involves successively molding the opposite upper and lower halves 20 and 22 of casing 16 with filament core 12 disposed in a longitudinally-extending relation to provide an elongated strip-like form with filament core 12 encased by and extending longitudinally through casing 16.

More particularly, two molds 54 and 56 are provided. The first mold 54 has recesses 58 defined therein being interconnected in a pattern adapted to receive the tied and closed loops 14 of filament core 12. Thus, as a first step being seen in FIG. 8, core 12 is placed in a longitudinally-extending disposition in first mold 54. Then, one of the pair of opposite upper and lower halves 20 or 22 of casing 16, for example, lower half 22 thereof, is fabricated in first mold 54. As seen in FIG. 9, lower casing half 22 encases longitudinally-extending core 12 and generally overlies one side of core 12. Next, the upper casing half 20 is fabricated in second mold 56 such that it overlies the other side of core 12 and attaches or bonds to lower casing half 22, thereby providing the final elongated strip-like casing 16 with filament core 12 encased by and extending longitudinally through casing 16.

It should be noted that, after the lower casing half 22 has been fabricated, it is removed, with core 12 encased therein from the first mold 54. The formed combination of the lower casing half 22 at core 12 is then rotated about its own longitudinal axis approximately 180 degrees to position it for insertion in the second mold 56. Then the formed combination is placed in the second mold 56.

Each of the molds 54 and 56 have upstanding pins 60 spaced apart in a centrally-aligned longitudinal row to define the anchor holes 18 of strap 10. However, only a plurality of spaced partial anchor holes are formed in the respective halves 20 and 22 of casing 16 during the fabrication steps performed using the respective molds 54 and 56. These spaced partial anchor holes in the respective casing halves 20 and 22 are aligned such that they together form the complete anchor holes 18 in casing 16.

It should be appreciated that the strength and elasticity of the strap can be varied in several different ways. By using multi-strand or braided filaments composed of different numbers of strands the strength of the filament and, hence, strap 10 can be varied. The elasticity can be varied by changing the diameter of the closed loops of the filament core. For example, a larger diameter of loop would allow greater distance of travel in the longitudinal direction. Also, it should be realized that the embodiment of FIGS. 11 and 12 uses less casing material than that of FIGS. 1-3. The undulating edges 24' of casing 16' tend to straighten out when stretched, whereas the straight or linear edges 24 of casing 16 tend to become wavy upon stretching of the strap. Due to the encasement of filament 12, there is no tendency for its loops 14 to unravel.

Having described the basic parts, features and functions of the strap of the present invention, as well as several examples of its possible use in FIGS. 7A-7C and one possible method of its manufacture in FIGS. 8-10, it is unnecessary to detail the many other possible beneficial uses or the various methods of implementation possible as these will be readily perceivable to any ultimate user with even minimal mechanical ability.

While the invention has been described as having specific embodiments, it will be understood that it is capable of further modifications. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. An elastic reinforced tie-down strap, comprising:
   a core of reinforcing substantially nonstretchable filament formed in a plurality of interconnected closed loops; and
   an elongated casing of resilient stretchable material encasing said filament core so as to embed the same within and extending longitudinally through said material with portions of said material filling said closed loops of said filament core, said material portions being spaced apart and each having an anchor hole defined therein and through each of said respective closed loops of said filament core;
   said encased closed loops of said filament core and said casing material portions filling said closed loops being deformable in configuration to permit an increase in the lengths of said loops and thereby longitudinal stretching of said casing limited to an amount substantially equal to the combined increase in the lengths of said deformed loops;
   said loops by being closed and interconnected to one another coact together to limit stretchability of said casing material portions filling said loops and defining said respective anchor holes so as to provide tear resistace of said casing material portions around said anchor holes.

2. The strap as recited in claim 1, wherein:
said resilient stretchable material of said casing has a predetermined length of longitudinal stretch; and
said closed loops of filament encased by said casing are deformable in configuration to permit a length of longitudinal stretch of said casing substantially less than said predetermined length of longitudinal stretch thereof.

3. The strap as recited in claim 1, wherein said anchor holes are defined at respective centers of said closed loops of said filament core and at respective centers of said casing material portions filling said closed loops.

4. The strap as recited in claim 1, wherein said anchor holes are countersunk at opposite ends thereof.

5. The strap as recited in claim 1, wherein said closed loops of said core of filament are tied together.

6. The strap as recited in claim 1, wherein said core of filament includes overhand knots formed between said closed loops thereof.

7. The strap as recited in claim 1, wherein said core of filament includes square knots formed between said closed loops thereof.

8. The strap as recited in claim 1, wherein said core of filament is composed of nylon rope-like material.

9. The strap as recited in claim 1, wherein said core of filament is composed of polypropylene rope-like material.

10. The strap as recited in claim 1, wherein said casing is composed of rubber material.

11. The strap as recited in claim 1, wherein said casing is in an elongated strip-like form with said filament core extending longitudinally through said casing.

12. The strap as recited in claim 11, wherein said casing has opposite longitudinal edges which extend in a generally linear fashion and parallel with respect to one another.

13. The strap as recited in claim 11, wherein said casing has opposite longitudinal edges which extend in generally undulating configurations which match respective opposite longitudinal sides of said closed loops of said filament core.

14. The strap as recited in claim 11, wherein said filament core and said casing are severable so as to permit cutting thereof to desired lengths.

15. The strap as recited in claim 11, wherein said casing with said filament core therein is adapted to be wound into a roll thereof.

16. The strap as recited in claim 15, wherein said filament core and said casing are severable so as to permit cutting desired lengths of said strap from said roll.

17. A tie-down strapping device, comprising:
(a) an elastic reinforced tie-down strap including
(i) a core of reinforcing nonstretchable filament formed in a plurality of interconnected closed loops, and
(ii) an elongated casing of resilient stretchable material encasing said filament core so as to embed the same within and extending longitudinally through said material with portions of said material filling said closed loops of said filament core, said material portions being spaced apart and each having an anchor hole defined therein and through each of said respective closed loops of said filament core, (iii) said encased closed loops of said filament core and said casing material portions filling said closed loops being deformable in configuration to permit an increase in the lengths of said loops and thereby longitudinal stretching of said casing limited to an amount substantially equal to the combined increase in the lengths of said deformed loops,
(iv) said loops by being closed and interconnected to one another coact together to limit stretchability of said casing material portions filling said loops and defining said respective anchor holes so as to provide tear resistance of said casing material portions around said anchor holes; and
(b) at least one anchor hook with an end adapted for receipt through at least one of said anchor holes in said material portions of said casing.

18. The strapping device as recited in claim 17, wherein:
said resilient stretchable material of said casing has a predetermined length of longitudinal stretch; and
said closed loops of filament encased by said casing are deformable in configuration to permit a length of longitudinal stretch of said casing substantially less than said predetermined length of longitudinal stretch thereof.

19. The strapping device as recited in claim 17, wherein said anchor holes are defined at respective centers of said closed loops of said filament core.

20. The strapping device as recited in claim 17, wherein said anchor holes have countersunk configurations at opposite ends thereof for facilitating insertion therethrough of said end of said anchor hook.

21. The strapping device as recited in claim 17, wherein said closed loops of said core of filament are tied together.

22. The strapping device as recited in claim 17, wherein the configuration of each of said closed loops of said filament core within said casing is deformable to permit sufficient longitudinal stretch in said casing to facilitate hooking and unhooking of said anchor hook in securement and releasing securement of said strapping device, while at the same time each of said filament core loop limits the longitudinal stretch in said casing to prevent recoil movement of said strapping device in the event of a sudden release of securement thereof.

23. An elastic reinforced tie-down strap, comprising:
a core of reinforcing substantially nonstretchable filament formed in a plurality of closed loops being interconnected together in a serial arrangement wherein said plurality of closed loops are composed of a pair of opposite end loops and one or more intermediate loops located between said end loops; and
an elongated casing of resilient stretchable material encasing said filament core so as to embed the same within and extending longitudinally through said material with portions of said material filling said end and intermediate closed loops of said filament core, said material portions being spaced apart and each having an anchor hole defined therein and through each of said respective closed loops of said filament core;
said resilient stretchable material of said casing having a predetermined length of longitudinal stretch;
said encased closed loops of said filament core and said casing material portions filling said closed loops being deformable in configuration to permit an increase in the lengths of said loops and thereby in the length of longitudinal stretch of said casing but substantially less than said predetermined length of longitudinal stretch thereof;

said loops by being closed and interconnected to one another coact together to limit stretchability of said casing material portions filling said loops and defining said respective anchor holes so as to provide tear resistance of said casing material portions around said anchor holes.

24. The strap as recited in claim 23, wherein said anchor holes are defined at respective centers of said closed loops of said filament core and at respective centers of said casing material portions filling said closed loops.

25. The strap as recited in claim 23, further comprising:

at least one anchor hook with an end adapted for receipt through at least one of said anchor holes in said material portions of said casing.

* * * * *